(12) United States Patent
Ouellette et al.

(10) Patent No.: US 12,254,473 B2
(45) Date of Patent: Mar. 18, 2025

(54) SYSTEMS, METHODS, AND DEVICES FOR INTEGRATING A FIRST PARTY SERVICE INTO A SECOND PARTY COMPUTER APPLICATION

(71) Applicant: JPMorgan Chase Bank, N.A., New York, NY (US)

(72) Inventors: Scott H. Ouellette, Kingston, NH (US); Nasir Khan, San Ramon, CA (US); Robert M. Soulchin, King of Prussia, PA (US); Michael K. O'Leary, Garden City Park, NY (US); Michael Naggar, Orinda, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 169 days.

(21) Appl. No.: 17/815,455

(22) Filed: Jul. 27, 2022

(65) Prior Publication Data
US 2022/0374900 A1   Nov. 24, 2022

Related U.S. Application Data

(62) Division of application No. 15/612,167, filed on Jun. 2, 2017, now Pat. No. 11,429,971.
(Continued)

(51) Int. Cl.
*G06Q 20/40* (2012.01)
*G06Q 20/38* (2012.01)
*G06Q 20/36* (2012.01)

(52) U.S. Cl.
CPC ....... *G06Q 20/4014* (2013.01); *G06Q 20/382* (2013.01); *G06Q 20/36* (2013.01); *G06Q 2220/123* (2013.01)

(58) Field of Classification Search
None
See application file for complete search history.

(56) References Cited

U.S. PATENT DOCUMENTS

| 7,120,608 | B1 |  | 10/2006 | Gallagher |  |
|---|---|---|---|---|---|
| 7,542,942 | B2 | * | 6/2009 | Peart ..................... | G06Q 20/10 705/39 |

(Continued)

FOREIGN PATENT DOCUMENTS

| AU | 2014262719 A1 | * | 11/2015 | ....... G06K 19/06028 |
| AU | 2011316955 B2 | * | 12/2016 | ............. A63F 13/00 |

(Continued)

OTHER PUBLICATIONS

M. Alhanahnah and D. Chadwick, "Boosting Usability for Protecting Online Banking Applications Against APTs," 2016 Cybersecurity and Cyberforensics Conference (CCC), Amman, Jordan, 2016. https://ieeexplore.ieee.org/document/7600213?source=IQplus (Year : 2016).*

(Continued)

*Primary Examiner* — El Mehdi Oussir
(74) *Attorney, Agent, or Firm* — GREENBERG TRAURIG LLP

(57) ABSTRACT

Systems, methods, and devices for integrating a first party service into a second party computer application are disclosed. In one embodiment, in a financial institution comprising at least one computer processor, a method for integrating a financial services payment service into a merchant computer application may include (1) receiving customer electronic device information from a customer electronic device using a first communication channel; (2) transmitting a passcode to the customer electronic device using a second communication channel; (3) receiving the passcode from the customer electronic device over the first communication channel; (4) sending a session identifier to electronic device (Continued)

over first communication channel; (5) receiving the session identifier from a merchant host; and (6) sending an authentication value to a merchant host. The merchant host may provide the authentication value to the customer electronic device.

8 Claims, 9 Drawing Sheets

Related U.S. Application Data

(60) Provisional application No. 62/345,390, filed on Jun. 3, 2016.

(56) References Cited

U.S. PATENT DOCUMENTS

| | | | |
|---|---|---|---|
| 7,818,264 B2 | 10/2010 | Hammad | |
| 8,831,979 B1 | 9/2014 | Gerson | |
| 8,914,642 B2* | 12/2014 | Hayashi | G06F 21/31 |
| | | | 713/182 |
| RE45,416 E * | 3/2015 | Bishop | G06Q 20/3278 |
| | | | 713/172 |
| 9,292,870 B2 | 3/2016 | Langley | |
| 9,760,871 B1* | 9/2017 | Pourfallah | G06Q 10/10 |
| 9,978,062 B2 | 5/2018 | Raj | |
| 10,032,022 B1 | 7/2018 | Hague | |
| 10,290,003 B1 | 5/2019 | Hammad | |
| 10,325,261 B2* | 6/2019 | Dimmick | G06Q 20/4014 |
| 10,521,799 B1 | 12/2019 | Walters | |
| 11,928,668 B1* | 3/2024 | Kurani | G06Q 20/385 |
| 11,961,063 B1* | 4/2024 | Spector | G06Q 20/3274 |
| 2004/0098740 A1* | 5/2004 | Maritzen | G07F 7/1008 |
| | | | 725/50 |
| 2007/0088801 A1 | 4/2007 | Levkovitz | |
| 2009/0008441 A1* | 1/2009 | Montgomery | G06Q 30/02 |
| | | | 235/379 |
| 2009/0125446 A1* | 5/2009 | Saunders | G07C 9/29 |
| | | | 235/379 |
| 2009/0271278 A1* | 10/2009 | Bishop | G06Q 20/02 |
| | | | 235/380 |
| 2010/0318783 A1 | 12/2010 | Raj et al. | |
| 2010/0327054 A1 | 12/2010 | Hammad | |
| 2011/0119155 A1 | 5/2011 | Hammad et al. | |
| 2012/0041881 A1 | 2/2012 | Basu et al. | |
| 2012/0173348 A1 | 7/2012 | Yoo et al. | |
| 2012/0253852 A1* | 10/2012 | Pourfallah | G06Q 20/327 |
| | | | 705/41 |
| 2013/0085944 A1 | 4/2013 | Fielder | |
| 2013/0159029 A1 | 6/2013 | Thaw | |
| 2013/0290187 A1* | 10/2013 | Itwaru | G06Q 20/3227 |
| | | | 705/44 |
| 2013/0346302 A1* | 12/2013 | Purves | G06Q 20/102 |
| | | | 705/40 |
| 2014/0074637 A1* | 3/2014 | Hammad | G06Q 20/326 |
| | | | 705/41 |
| 2014/0090045 A1* | 3/2014 | Sanchez | G06Q 20/3224 |
| | | | 726/9 |
| 2014/0108252 A1* | 4/2014 | Itwaru | G06Q 20/3276 |
| | | | 705/44 |
| 2014/0164254 A1 | 6/2014 | Dimmick | |
| 2014/0279469 A1* | 9/2014 | Mendes | G06Q 20/401 |
| | | | 705/41 |
| 2014/0344153 A1* | 11/2014 | Raj | G06Q 20/385 |
| | | | 705/44 |
| 2014/0365373 A1 | 12/2014 | Pelegero | |
| 2015/0032626 A1 | 1/2015 | Dill et al. | |
| 2015/0088746 A1 | 3/2015 | Hoffman | |
| 2015/0106187 A1* | 4/2015 | Berardi | G06Q 30/0224 |
| | | | 705/14.27 |
| 2015/0127547 A1* | 5/2015 | Powell | G06Q 20/382 |
| | | | 705/67 |
| 2015/0161597 A1 | 6/2015 | Subramanian et al. | |
| 2015/0304110 A1* | 10/2015 | Oberheide | H04L 9/3215 |
| | | | 713/155 |
| 2015/0312038 A1 | 10/2015 | Palanisamy | |
| 2015/0356560 A1 | 12/2015 | Shastry et al. | |
| 2015/0371221 A1 | 12/2015 | Wardman | |
| 2015/0371225 A1 | 12/2015 | Zhao | |
| 2016/0019536 A1* | 1/2016 | Ortiz | G06Q 20/36 |
| | | | 705/67 |
| 2016/0171492 A1* | 6/2016 | Carrott | G06Q 20/40 |
| | | | 705/71 |
| 2016/0224977 A1* | 8/2016 | Sabba | G06Q 20/385 |
| 2016/0239733 A1 | 8/2016 | Hertz et al. | |
| 2016/0292635 A1 | 10/2016 | Todasco | |
| 2016/0292784 A1 | 10/2016 | Granbery | |
| 2016/0300192 A1 | 10/2016 | Zamer | |
| 2016/0307194 A1 | 10/2016 | Bhatnagar et al. | |
| 2017/0046679 A1* | 2/2017 | Gotlieb | G06Q 20/34 |
| 2017/0083906 A1 | 3/2017 | Gaur et al. | |
| 2017/0091764 A1 | 3/2017 | Lloyd et al. | |
| 2017/0193503 A1 | 7/2017 | Oppenheim | |
| 2017/0195879 A1 | 7/2017 | Jones-Mcfadden | |
| 2017/0243184 A1 | 8/2017 | Bondesen et al. | |
| 2017/0255915 A1 | 9/2017 | Chandrasekaran et al. | |
| 2017/0330181 A1 | 11/2017 | Ortiz | |
| 2018/0198774 A1* | 7/2018 | Pitel | H04L 63/0428 |
| 2019/0034924 A1 | 1/2019 | Prabhu et al. | |
| 2019/0139023 A1 | 5/2019 | Vyas et al. | |
| 2019/0213589 A1* | 7/2019 | Aabye | H04L 63/06 |
| 2019/0295074 A1* | 9/2019 | Carrott | H04L 63/0838 |
| 2019/0385160 A1* | 12/2019 | Safak | G06Q 20/3829 |
| 2021/0209582 A1* | 7/2021 | Paliwal | G06F 21/31 |
| 2022/0076252 A1 | 3/2022 | Prabhu et al. | |

FOREIGN PATENT DOCUMENTS

| | | | | |
|---|---|---|---|---|
| CA | 2726787 A1 | * | 12/2009 | G06K 19/07 |
| CA | 2755366 A1 | * | 11/2010 | G06Q 20/105 |
| CN | 103370688 | | 11/2016 | |
| CN | 104737176 | | 10/2017 | |
| CN | 104115172 B | * | 11/2017 | G06Q 20/202 |
| CN | 111062720 | | 4/2020 | |
| CN | 105229683 B | * | 6/2020 | G06Q 20/20 |
| CN | 113379401 A | * | 9/2021 | G06Q 20/02 |
| CN | 113656781 | | 11/2021 | |

OTHER PUBLICATIONS

Chang TK. A secure operational model for mobile payments. ScientificWorldJournal. 2014. https://pmc.ncbi.nlm.nih.gov/articles/PMC4217240/ (Year: 2014).*
S. W. Neville et al., "Efficiently Achieving Full Three-Way Non-repudiation in Consumer-Level eCommerce and M-Commerce Transactions," 2011IEEE 10th International Conference on Trust, Security and Privacy in Computing and Communications, China.https://ieeexplore.ieee.org/document/6120878?source=IQplus (Year: 2011).*
Diaz-Santiago; et al., A cryptographic study of tokenization systems, International Journal of Information Security, 15, 413-432, Jan. 22, 2016.
Urien; et al., "A breakthrough for prepaid payment: End to end token exchange and management using secure SSL channels created by EAP-TLS smart cards," 2011, pp. 476-483. h.

* cited by examiner

SYSTEMS, METHODS, AND DEVICES FOR INTEGRATING A FIRST PARTY SERVICE INTO A SECOND PARTY COMPUTER APPLICATION

RELATED APPLICATIONS

This application is a Divisional of U.S. patent application Ser. No. 15/612,167, filed Jun. 2, 2017, now U.S. Pat. No. 11,429,971, which claims priority to U.S. Provisional Patent Application Ser. No. 62/345,390, filed Jun. 3, 2016, the disclosure of each of which is hereby incorporated by reference in its entirety.

BACKGROUND OF THE INVENTION

1. Field of the Invention

The present disclosure generally relates to systems, methods, and devices for integrating a first party service into a second party computer application are disclosed.

2. Description of the Related Art

Consumers use mobile applications provided by merchants to conduct payments. For example, a consumer shopping at Merchant A may approach a point of sale device and opt to pay using Merchant A's mobile application. Alternatively, a consumer shopping on-line with Merchant A may decide to purchase what is in the virtual shopping cart. Merchant A's mobile application will require the consumer to authenticate to the financial institution before the transaction can be conducted using, for example, username and password, biometrics, etc.

SUMMARY OF THE INVENTION

Systems, methods, and devices for integrating a first party service into a second party computer application are disclosed. In one embodiment, a method for integrating a service for a first party into a computer application for a second party may include a computer processor for a first party performing the following: (1) receiving customer electronic device information from a customer electronic device; and (2) sending an authentication value to a computer processor for a second party, wherein the computer processor for the second party provides the authentication value to a computer application executed by the customer electronic device.

In one embodiment, the customer electronic device may be a mobile electronic device.

In one embodiment, the computer processor for the first party may communicate at least a portion of the customer electronic device information to the computer processor for the second party.

In one embodiment, the computer processor for the first party receives the customer electronic device information using a first communication channel, transmits a passcode to the computer application executed by the customer electronic device using a second communication channel, and receives the passcode from the computer application executed by the customer electronic device over the first communication channel. In one embodiment, the passcode may be a one-time passcode.

In one embodiment, the at least one computer processor for the first party sends a session identifier to the computer application executed by the customer electronic device, and receives the session identifier from the at least one computer processor for the second party.

In one embodiment, the authentication value may be stored in secure memory of the customer electronic device.

In one embodiment, the first party may be a financial institution, and the second party may be a merchant.

According to another embodiment, a method for conducting a transaction using an authentication value may include a computer processor for a first party performing the following: (1) receiving, from a customer electronic device executing a computer application for a second party, a transaction request comprising an authentication value; (2) validating the authentication value; (3) transmitting to the computer application for the second party executed by the customer electronic device a customer account identifier; (4) receiving from the second party an authorization request comprising the customer account identifier; and (5) approving the authorization request and transmitting authorization to the second party.

In one embodiment, the first party may be a financial institution, and the second party may be a merchant.

In one embodiment, the computer processor for the first party transmits to the computer application for the second party a transaction account identifier for at least one customer account; and a SDK for the first party in the computer application for the second party renders a machine-readable code for a transaction account. The machine-readable code may be a QR code that comprises at least one of a digital primary account number for the transaction account associated with the transaction account identifier, a transaction account expiration date, a transaction account cryptogram, and a token requestor identifier.

In one embodiment, the authentication value may be stored in secure memory of the customer electronic device.

In one embodiment, the customer may be authenticated using by computer application for the second party.

In one embodiment, the method may further include the computer processor for the first party transmitting, to the computer application for the second party, a session identifier with a transaction account identifier; and the computer processor for the first party receiving the session identifier from the computer processor for the second party.

In one embodiment, the customer electronic device may be a mobile electronic device.

According to another embodiment, a method for conducting a transaction using an authentication value may include a computer processor for a first party performing the following: (1) receiving, from a customer electronic device executing a computer application for a second party, a transaction request to pay for a transaction using a wallet for the first party, the transaction request comprising an authentication value; (2) validating the authentication value by comparing the authentication value to a stored authentication value; (3) receiving, from the computer processor for the second party. an authorization request; and (4) approving the authorization request and transmitting authorization to the merchant payment host.

In one embodiment, the first party may be a financial institution, and the second party may be a merchant.

In one embodiment, the authentication value may be stored in secure memory of the customer electronic device.

In one embodiment, the computer processor for the first party further receives a cryptogram for a payment account from the computer processor for the second party.

In one embodiment, the method may further include the computer processor for the first party transmitting, to the computer application for the second party, a session identifier; and the computer processor for the first party receiving the session identifier from the computer processor for the second party.

In one embodiment, the customer electronic device may be a mobile electronic device.

According to another embodiment, a method for conducting a transaction using an authentication value may include: (1) a computer processor for a first party receiving, from a point of transaction device for the first party, a transaction request to pay for a transaction for a good or service using an electronic wallet for a second party, the transaction request comprising an authentication value; (2) the point of transaction device generating a machine-readable code comprising an identifier for the good or service and displaying the machine-readable code on a display; (3) the computer processor for a first party receiving transaction account information for the transaction; (4) the computer processor for a first party transmitting an authorization request for the transaction comprising the transaction account information to the computer processor for the second party; and (5) the computer processor for a first party receiving authorization from the computer processor for the second party.

In one embodiment, the first party may be a merchant and the second party may be a financial institution.

In one embodiment, the method may further include the computer processor for a first party receiving, from a computer application for the first party executed by an electronic device computer processor for a customer electronic device, a session identifier and the identifier for the good or service; and the computer processor for the first party communicating the session identifier to an electronic wallet service provider for the second party.

In one embodiment, the transaction account information may include a cryptogram for a payment account.

In one embodiment, the customer electronic device may be a mobile electronic device.

In another embodiment, in a financial institution comprising at least one computer processor, a method for integrating a financial services payment service into a merchant computer application may include (1) the at least one computer processor receiving customer electronic device information from a customer electronic device using a first communication channel; (2) the at least one computer processor transmitting a passcode to the customer electronic device using a second communication channel; (3) the at least one computer processor receiving the passcode from the customer electronic device over the first communication channel; (4) the at least one computer processor sending a session identifier to electronic device over first communication channel; (5) the at least one computer processor receiving the session identifier from a merchant host; and (6) the at least one computer processor sending an authentication value to a merchant host. The merchant host may provide the authentication value to the customer electronic device.

In one embodiment, at least one of the customer electronic device information and the passcode may be received from an application for the financial institution or at a website associated with the financial institution.

In one embodiment, the method may further include the at least one computer processor receiving an identification of the second communication channel from the customer electronic device.

In one embodiment, the passcode may be a one-time passcode.

In one embodiment, the session identifier may be sent to the electronic device in response to the passcode sent over the second communication channel matching the passcode received over the first communication channel.

In one embodiment, the authentication value stored may be secure memory of the customer electronic device. The secure memory may be one of a key ring and a key vault.

According to another embodiment, in a financial institution comprising at least one computer processor a method for conducting a transaction using an authentication value may include (1) the at least one financial institution computer processor receiving, from a customer electronic device executing a merchant application for a merchant a transaction request comprising an authentication value; (2) the at least one financial institution computer processor validating the authentication value; (3) the at least one financial institution computer processor transmitting, to the merchant application a payment account identifier for at least one payment account for the customer; (4) the at least one financial institution computer processor receiving, from a merchant payment host, an authorization request comprising the payment account identifier; (5) the at least one financial institution computer processor approving the authorization request and transmitting authorization to the merchant payment host; and (6) the at least one financial institution computer processor receiving a confirmation message from the merchant payment host comprising at least one of the merchant name, the merchant address, a date/time of the transaction, a transaction amount, a transaction reference number, and an electronic link to a transaction receipt.

In one embodiment, a SDK for the financial institution in the merchant application may render a machine-readable code for the payment account identifier. The machine-readable code may be a payment-network standard QR code and may include one or more of a digital primary account number for the payment account associated with the payment account identifier, a payment account expiration date, a payment account cryptogram, and a token requestor identifier.

In one embodiment, the authentication value may be stored secure memory of the customer electronic device.

In one embodiment, the customer may be authenticated using the merchant application.

In one embodiment, the method may further include the at least one computer processor transmitting, to the merchant application, a session identifier with the payment account identifier; and the at least one computer processor receiving the session identifier from the merchant payment host.

According to another embodiment, at a financial institution comprising at least one computer processor a method for conducting a transaction using an authentication value may include (1) the at least financial institution one computer processor receiving, from a customer electronic device executing a merchant application for a merchant, a transaction request to pay for a transaction using a financial institution wallet, the transaction request comprising an authentication value; (2) the at least one financial institution computer processor validating the authentication value; (3) the at least one financial institution computer processor transmitting, to the merchant application, a session identifier; (4) the at least one financial institution computer processor receiving, from a merchant payment host, the session identifier, wherein the session identifier is received from the merchant application; (5) the at least one financial institution computer processor receiving, from the merchant payment host, an authorization request; (6) the at least one financial institution computer processor approving the authorization request and transmitting authorization to the merchant payment host; and (7) the at least one financial institution computer processor receiving a confirmation message from the merchant payment host.

In one embodiment, the authentication value may be stored in secure memory of the customer electronic device.

In one embodiment, the at least one computer processor may also receive a cryptogram for the payment account from the merchant payment host.

In one embodiment, the confirmation message may include at least one of the merchant name, the merchant address, a date/time of the transaction, a transaction amount, a transaction reference number, and an electronic link to a transaction receipt.

According to another embodiment, at a financial institution comprising at least one computer processor, a method for conducting a transaction using an authentication value may include (1) the at least one merchant payment host computer processor receiving, from the merchant point of transaction device, a transaction request to pay for a transaction for a good or service using a financial institution wallet, the transaction request comprising an authentication value; (2) the point of transaction device generating a machine-readable code comprising an identifier for the good or service and displaying the machine-readable code on a display; (3) the merchant payment host computer processor receiving, from a merchant application executed by an electronic device computer processor for a customer electronic device, a session identifier and the identifier for the good or service; (4) the merchant payment host computer processor communicating the session identifier to a wallet service provider for the financial institution; (5) the merchant payment host computer processor receiving payment account information for the transaction; (6) the merchant payment host computer processor transmitting an authorization request for the transaction comprising the payment account information to the financial institution; (7) the merchant payment host computer processor receiving authorization from the financial institution; and (8) the merchant payment host receiving a confirmation message from the financial institution.

In one embodiment, the payment account information may include a cryptogram for a payment account.

In one embodiment, the confirmation message may include at least one of the merchant name, the merchant address, a date/time of the transaction, a transaction amount, a transaction reference number, and an electronic link to a transaction receipt.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems, methods, and devices for integrating a financial services payment service into a merchant computer application.

In one embodiment, systems and methods for establishing a connection between a consumer, the consumer's electronic device (e.g., a mobile device such as a smart phone, tablet computer, desktop computer, wearable devices, Internet of Things (IoT) appliance, etc.), and a merchant computer application are disclosed. The process may involve multi-factor authentication (e.g., one-time passwords, out-of-band authentication, biometric authentication, etc.) or any other suitable type of authentication. The result of the authentication is an authentication value that may be stored on the electronic device. In one embodiment, the authentication value may be referred to as a "CMAC," which stands for "Consumer Merchant Authentication Code." Note that this nomenclature is not limiting in any manner.

The use of the CMAC value may eliminate the need to have the consumer log in to the financial institution for future transactions. Once the consumer is authenticated by the merchant, the CMAC may be used to authenticate the consumer to the financial institution.

In one embodiment, the CMAC value may be managed by a financial institution. Because the CMAC links the consumer, the consumer's device, and the merchant, the financial institution may have a variety of options should there be a compromise. For example, if the merchant is compromised, the financial institution may revoke or suspend all CMACs that are associated with that merchant (e.g., for all consumers, all of the customer's devices, etc.). If the consumer loses one of his or her electronic devices (e.g., a smart phone), the financial institution may revoke or suspend all CMACs for that electronic device (e.g., for all merchants), while keeping the CMACs active on the consumer's other electronic device(s) (e.g., a tablet). If the consumer's financial institution credentials are compromised, then the financial institution may revoke or suspend all CMACs associated with the consumer (i.e., all devices and all merchants).

In one embodiment, the CMAC may have an expiration date, and the consumer may be required to re-authenticate with the financial institution when the CMAC expires.

In one embodiment, when the consumer deletes a merchant application, gets a new phone, adds a new device, etc., the consumer may be required to re-provision a CMAC regardless of the CMAC's expiration date.

Figure 1:
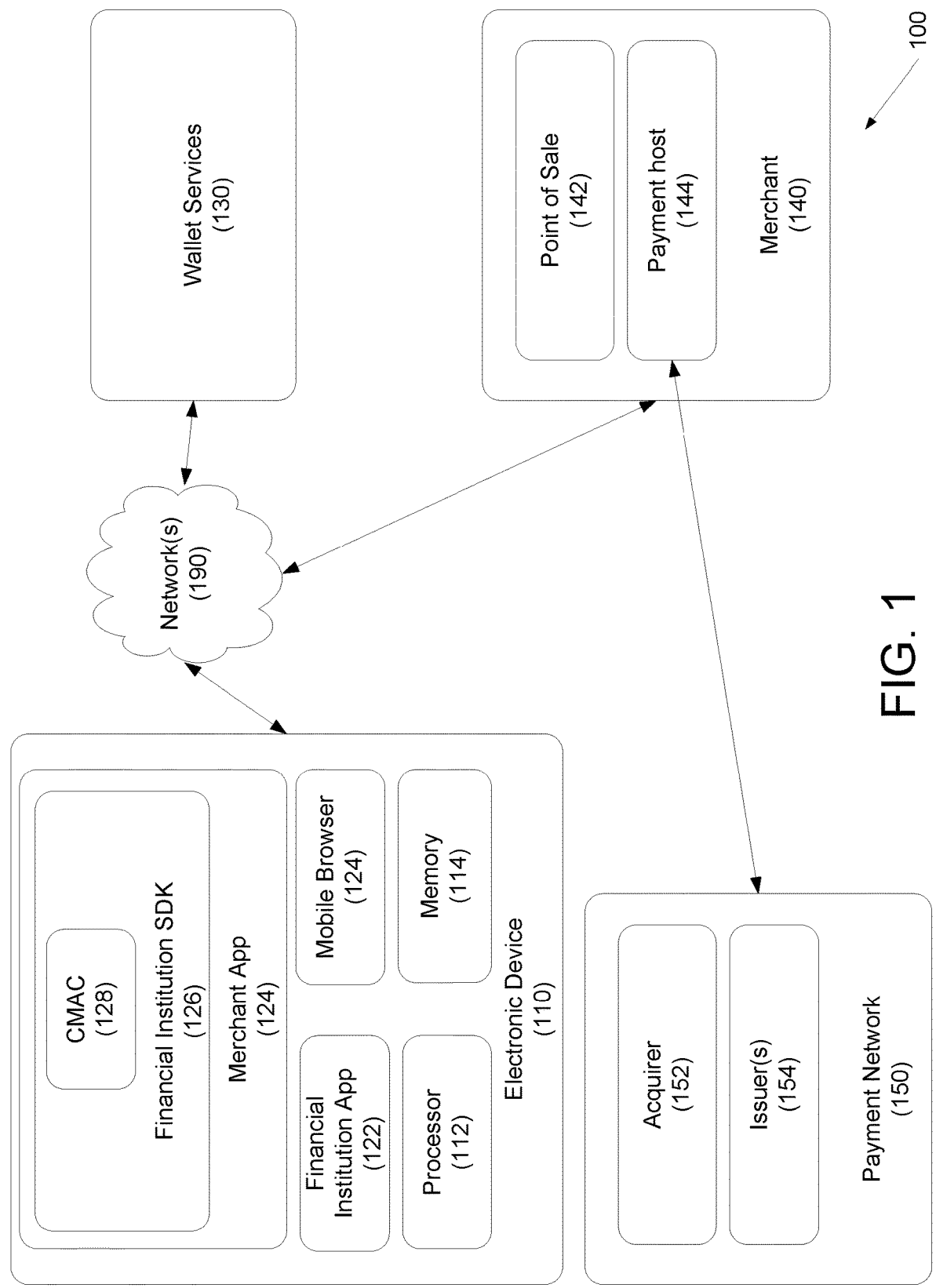
FIG. 1 depicts a system for integrating a financial services payment service into a merchant computer application according to one embodiment.

Referring to FIG. 1, a system for integrating a financial services payment service into a merchant computer application is disclosed according to one embodiment. System 100 may include consumer electronic device 110, which may be any suitable electronic device including one or more processor 114, memory 114, an input/output (not shown), and a network interface (not shown). Examples include smartphones, tablet computers, notebook computers, desktop computers, workstations, Internet of Things (IoT) appliances, etc.

Electronic device 110 may execute an application ("app") or program 122 for a financial institution, or may access a financial institution website (e.g., a mobile website) via mobile browser 123, etc.

Electronic device 110 may also execute merchant app 124, which may be, for example, a merchant shopping app, a merchant payment app, etc. In one embodiment, merchant app 124 may be provided with software development kit (SDK) 126 for the financial institution. CMAC 128 may also be provided. In one embodiment, CMAC 128 may be stored in one or more location on electronic device 110. The location may depend on the manufacturer of electronic device 110, the operating system, etc. For example, CMAC 128 may be stored in a "key ring" or "key vault" on the device, in secure storage on electronic device 110, within merchant app 124, within SDK 126, etc. Other storage locations may be used as is necessary and/or desired.

In one embodiment, by storing CMAC 128 in a location other than merchant app 124 or SDK 126, merchant app 124 may be updated without requiring a new CMAC 128.

System 100 may further include wallet services 130. In one embodiment, wallet services may be provided by the financial institution that controls the wallet.

System 100 may further include one or more payment network 150, which may include acquirer 152 and one or more issuer 154.

System 100 may further include merchant 140, which may be a brick-and-mortar merchant, an on-line merchant, etc. In one embodiment, merchant 140 may include point of sale (POS) terminal 142 and payment host 144. In one embodiment, payment host 144 may comprise the main server that all POS terminals for a merchant connect with. In one embodiment, this may consolidate all payment processing for acquirer 152.

In one embodiment, electronic device 110, wallet services 130, merchant 140, and one or more payment network 150 may communicate over one or more communication network(s) 190. Communication networks 190 may include any suitable communication network, including for example, WiFi, cellular, satellite, etc.

Figure 2:
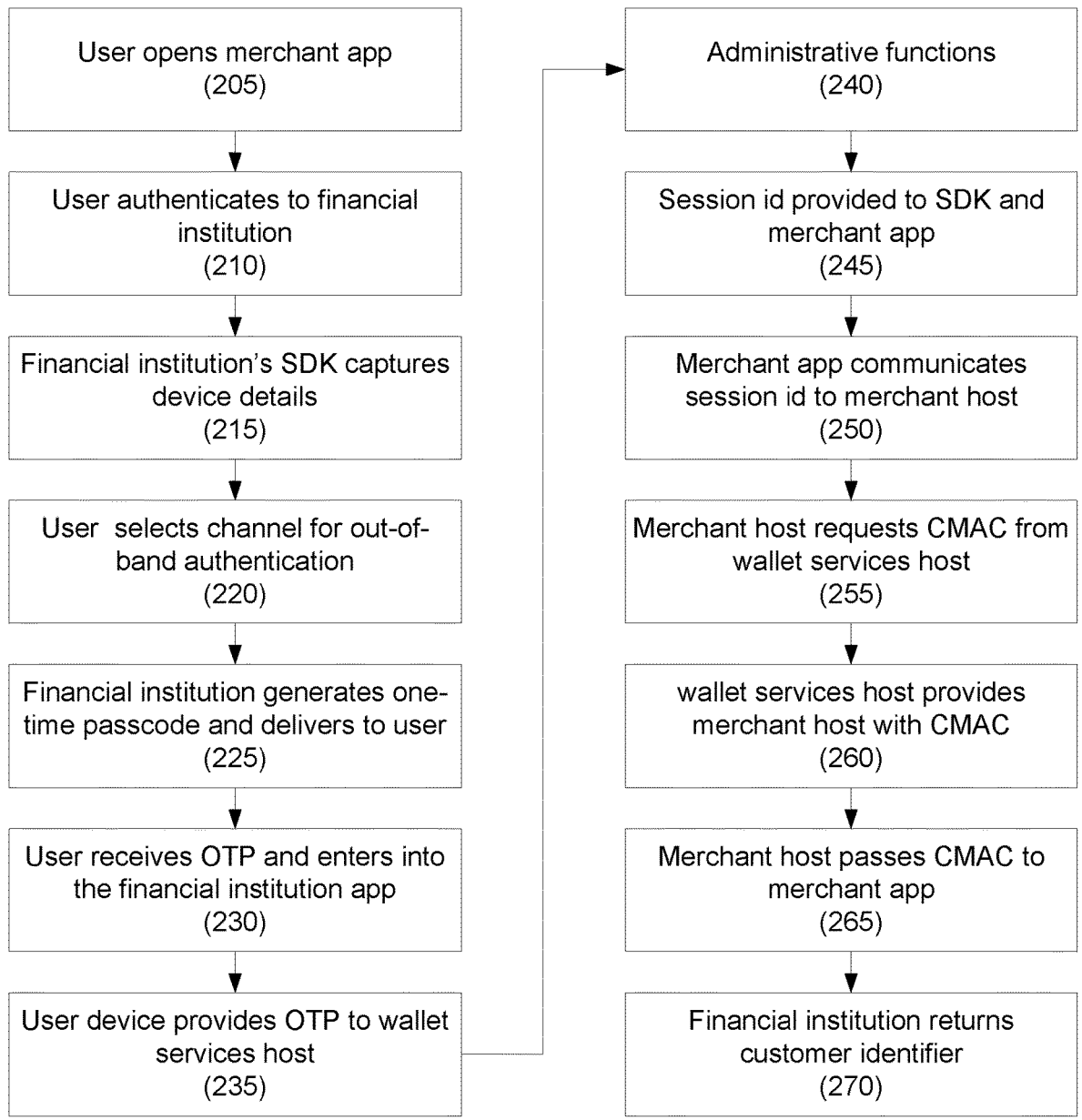
FIG. 2 depicts a method for registering a device for integration of a financial services payment service into a merchant computer application according to one embodiment.

Referring to FIG. 2, a method for registering a device for integration of a financial services payment service into a merchant computer application is disclosed according to one embodiment. Note that although FIG. 2 may reference specific products associated with a specific financial institution, the disclosure is not so limited, and has applicability to other financial intuitions, as well as other entities that may rely on another entity's authentication.

In step 205, a user may open or launch a merchant application ("app"), and the app may give the user the option of "provisioning" or "enabling" a financial institution's payment application capability. An example of such a payment application is JPMorgan Chase & Co.'s ChasePay$^{SM}$ application.

In step 210, the user may authenticate with the financial institution (e.g., Chase). The user may authenticate using the financial institution's payment application (e.g., ChasePay), by the financial institution's mobile application, by the financial institutions' mobile wallet, or by the mobile browser pointed to the financial institution's mobile website (e.g., m.chase.com). The user is then authenticated with the financial institution's wallet services host (e.g., Chase Pay Services host) using, for example, his or her financial institution login credentials (e.g., username/password, biometrics, etc.).

In step 215, the financial service's payment product SDK (e.g., Chase Pay SDK) may retrieve one or more device details (e.g., device type, serial number, IMEI, ICCID, MEID, SEID, etc.) and may upload those for the purposes of creating a device fingerprint.

In step 220, the user may be prompted to select the desired communication channel to receive an out-of-band message that will contain a one-time passcode, or OTP. Examples include email, SMS, voice, etc.

In step 225, the financial institution may generate the one-time passcode and communicate this to the user over the selected channel. In one embodiment, the user's registered contact information may be used to communicate the one-time passcode to the user.

In step 230, the user may receive the one-time passcode, and may enter it into the app, a mobile browser window, etc.

In step 235, the electronic device may provide the entered one-time passcode to the wallet services host, thereby linking, connecting, or associating the user and the user's device.

In step 240, administrative functions may be performed, such as prompting the user to accept the financial institution's terms and conditions, setting a default account, setting a default shipping address, etc.

In step 245, a session identifier, or session id, may be provided from the wallet services host to the financial service's payment product SDK and to the merchant app. In one embodiment, a CMAC may be provided with the session id.

In step 250, the merchant app may communicate the session identifier to the merchant host, and the merchant host may then pass the session identifier to the wallet services host. Thus, the session identifier will have completed a trip from the wallet services host, to the financial service's payment product SDK, to the merchant app, to the merchant host, and back to the wallet services host.

In step 255, the merchant host may further provide the user's loyalty identifier, customer identifier, etc., or any other information as is necessary and/or desired.

In step 260, the wallet services host may provide the merchant host with an authentication value, such as a CMAC, and in step 270, the merchant host may pass the CMAC to the merchant app. In one embodiment, the merchant app may pass the CMAC to the financial service's payment product SDK.

In one embodiment, in step 275, the financial institution may also return a financial institution customer identifier to support, for example, future rewards and loyalty processing. The user may be notified that the merchant app is ready for a transaction, and the financial service's payment product SDK may pass the CMAC to the wallet services host as part of each checkout transaction.

Figure 3:
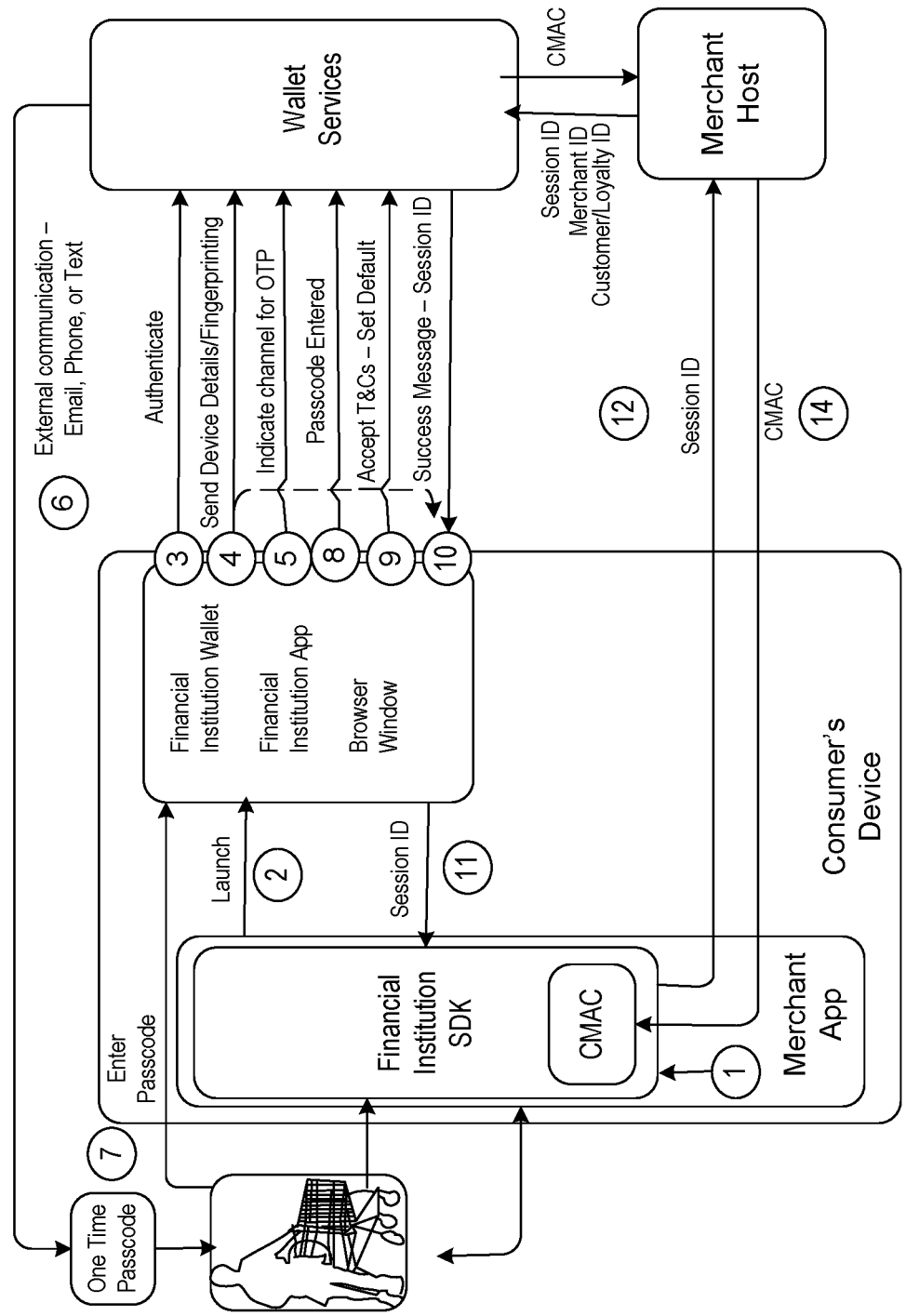
FIG. 3 depicts an exemplary process flow of the method of FIG. 2 according to one embodiment.

An exemplary, non-limiting process flow is provided as FIG. 3.

Figure 4:
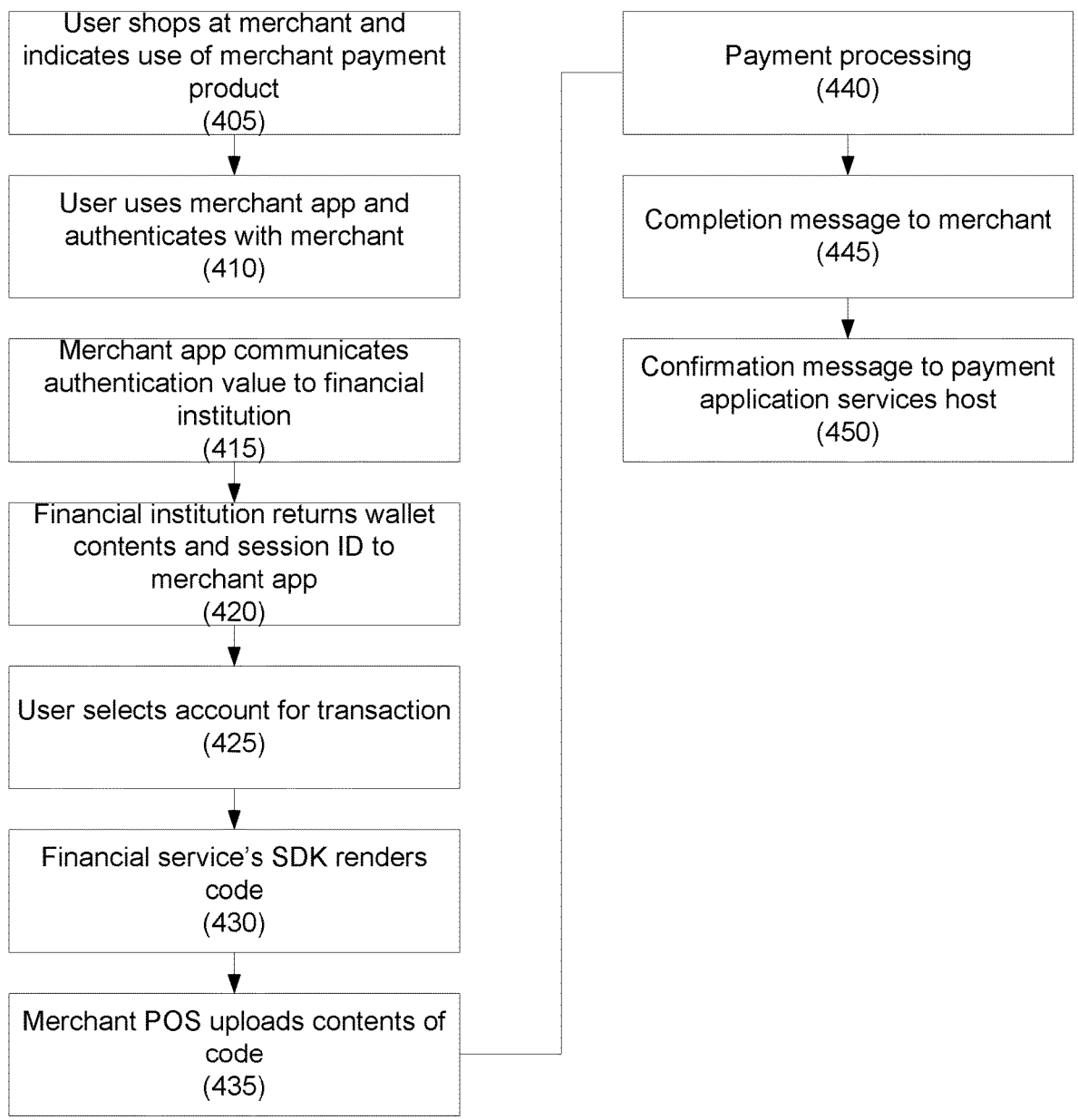
FIG. 4 depicts a checkout flow involving an authentication value according to one embodiment.

Referring to FIG. 4, a checkout flow involving an authentication value is provided according to one embodiment.

In step 405, a user may shop at a merchant, and may indicate that he or she wants to pay with a merchant's mobile payment product.

In step 410, the user may open or launch the merchant app, and may authenticate with the merchant. The user may then select the financial institution's payment product as the checkout option. An example of such is JPMorgan Chase & Co.'s ChasePay$^{SM}$ application.

In step 415, the merchant app may then communicate with the financial institution's wallet services host (e.g., Chase-Pay host) to initiate a session using an authentication value, such as a CMAC.

In step 420, the wallet services host may validate the authentication value and may return the wallet contents associated with the authentication value, and a session ID. In another embodiment, the wallet services host may identify the customer associated with the authentication value and may return the wallet contents associated with the user.

In step 425, the user may select a payment account for the transaction, or may accept the default account.

In step 430, the financial service's payment product SDK (e.g., ChasePay SDK) may render a machine-readable code, such as a payment-network standard QR code (e.g., Visa standard QR code) for the selected account. This may include for example, the digital primary account number ("DPAN"), expiration date, cryptogram, and the token requestor ID.

In step 435, the merchant point of sale/point of transaction terminal may upload the contents of the QR code, and may communicate the contents to the merchant's payment host.

In step 440, the payment processing may be performed as usual by the merchant's payment host via a connection to the issuer (e.g., Chase issuing) via a payment network (e.g., ChaseNet).

In step 445, a completion message may be sent from the issuer to the merchant and to the merchant's point of sale/point of transaction terminal.

In step 450, a confirmation message may be sent to the wallet services host with metadata to support post transaction services. In one embodiment, the metadata may include, for example, the merchant name, address, date/time of transaction, amount, and a transaction reference number. In one embodiment, the confirmation message may include a barcode for the receipt, a uniform resource locator for the actual receipt image, etc.

Figure 5:
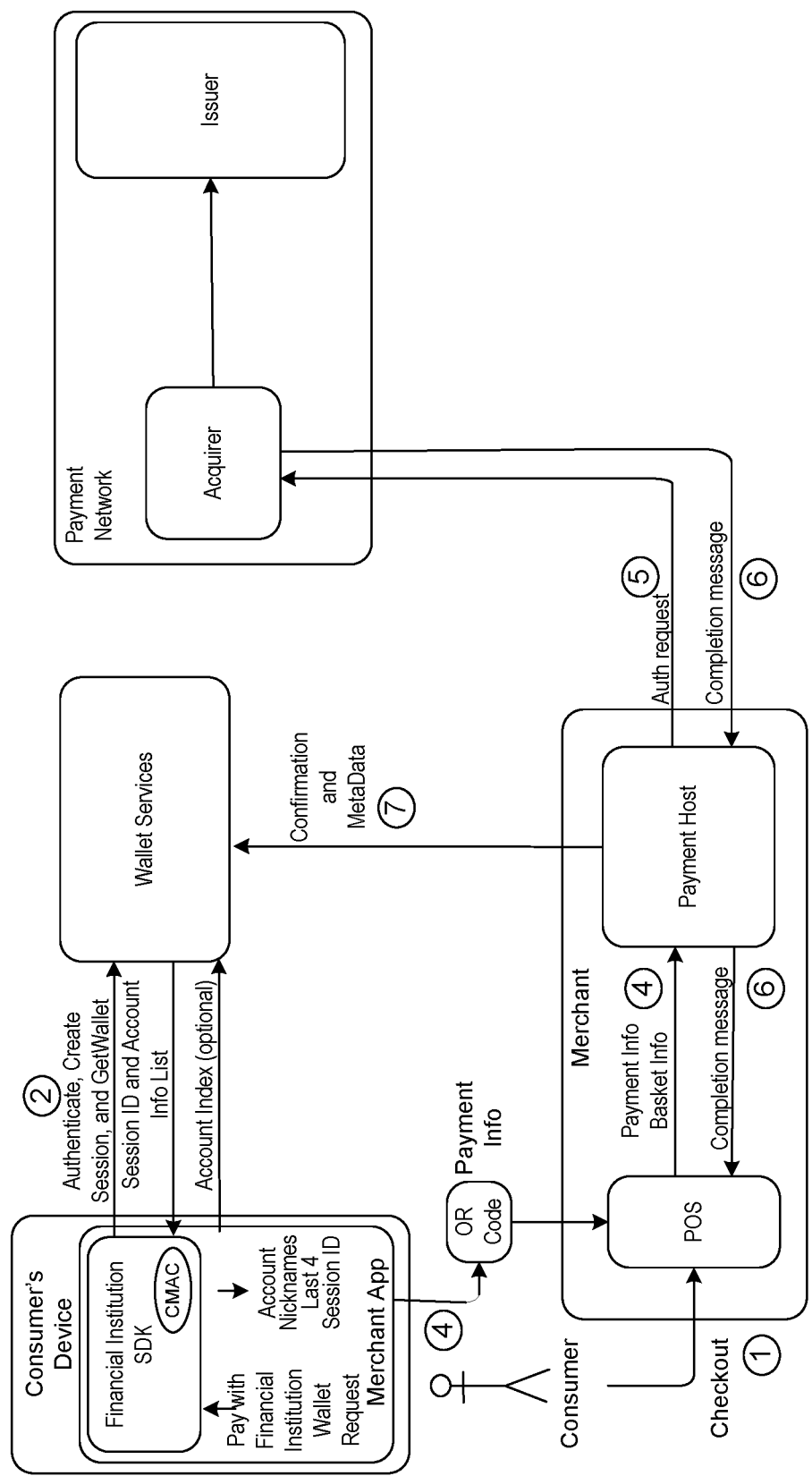
FIG. 5 depicts an exemplary process flow of the method of FIG. 4 according to one embodiment.

An exemplary, non-limiting process flow is provided as FIG. 5.

Figure 6:
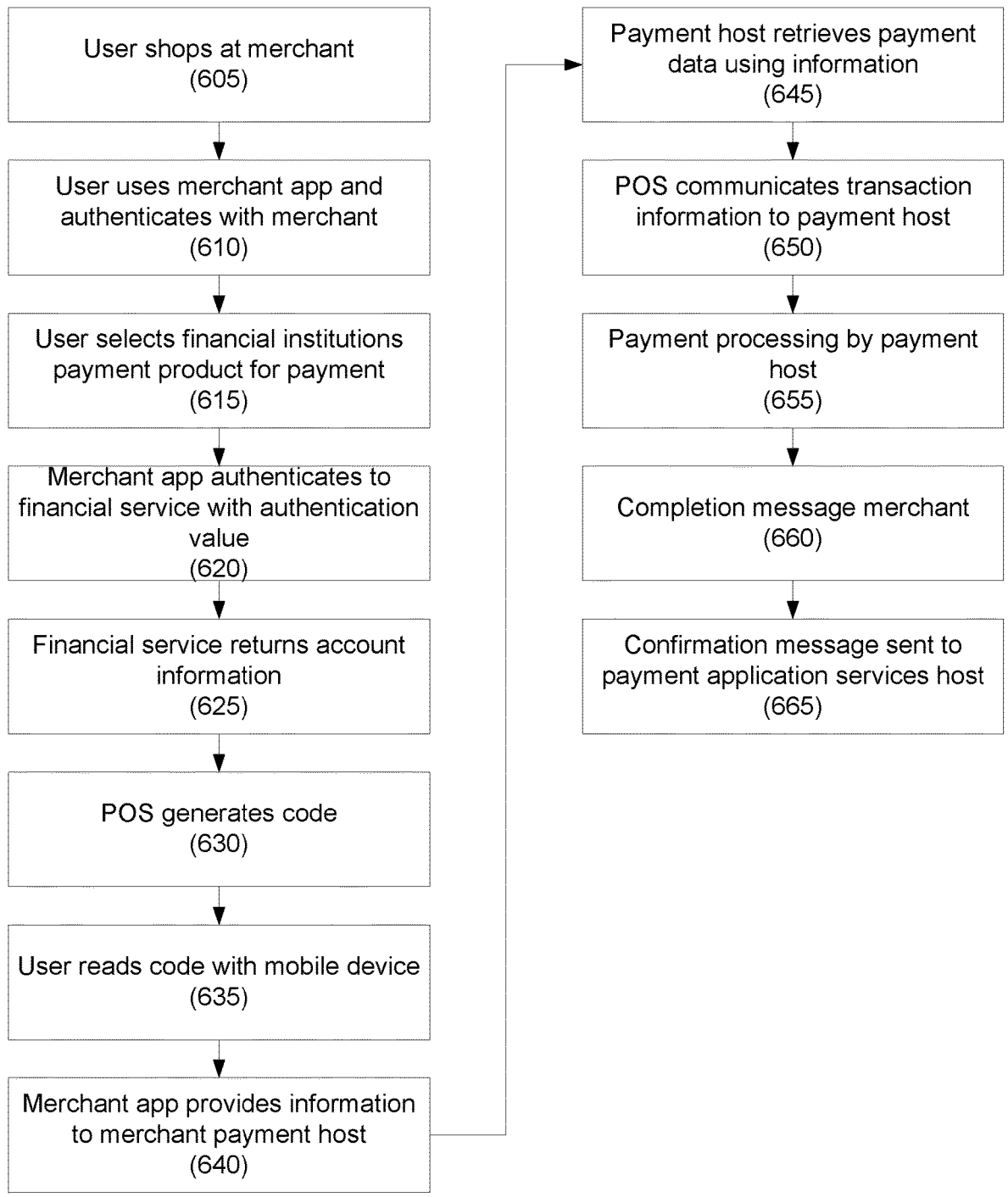
FIG. 6 depicts a checkout flow involving an authentication value according to another embodiment.

Referring to FIG. 6, a checkout flow involving an authentication value is provided according to another embodiment.

In step 605, a user may shop at the merchant, and may indicate that he or she wants to pay with the financial service's payment product (e.g., ChasePay).

In step 610, the user may open or launch the merchant app, and may authenticate with the merchant.

In step 615, the user may then select the financial institution's payment product as the checkout option.

In step 620, the merchant app may use the financial service's payment product SDK (e.g., ChasePay SDK) to authenticate with the financial service's payment product host (e.g., ChasePay host) using an authentication value, such as a CMAC, and may retrieve a session ID and the list of the wallet contents associated with the authentication value.

In step 625, information may be returned to give the user confirmation that the right account was selected (nickname, last 4 digits of the account number, etc.). The default account may be identified, but the user may be allowed to select a different account for this transaction.

In step 630, the merchant point of sale/point of transaction may generate a machine-readable code, such as a QR code, and, in step 635, the user may use the merchant app to scan the code.

In step 640, the merchant app may communicate the session ID, account index, and other data from the QR code to the merchant's payment host.

In step 645, the merchant payment host may use the session ID and account index to retrieve the payment details from the financial service's wallet services host. This may include a DPAN, expiration date, cryptogram, token requestor ID, contact info, last 4 digits of the account number, etc.

In step 650, the merchant point of sale/point of transaction may communicate with the merchant payment host and may provide basket info and total sale amount. This may be independent of other steps. The merchant payment host may then match the cart with the user and the payment details.

In step 655, payment processing may be performed as usual by the payment host via a connection to the issuer (e.g., Chase issuing) via a payment network (e.g., ChaseNet). This may be similar to step 440, above.

In step 660, a completion message may be sent from the issuer to the merchant and to the merchant's point of sale/point of transaction terminal. This may be similar to step 445, above.

In step 665, a confirmation message may be sent to the wallet services host with metadata to support post transaction services. This may be similar to step 450, above.

Figure 7:
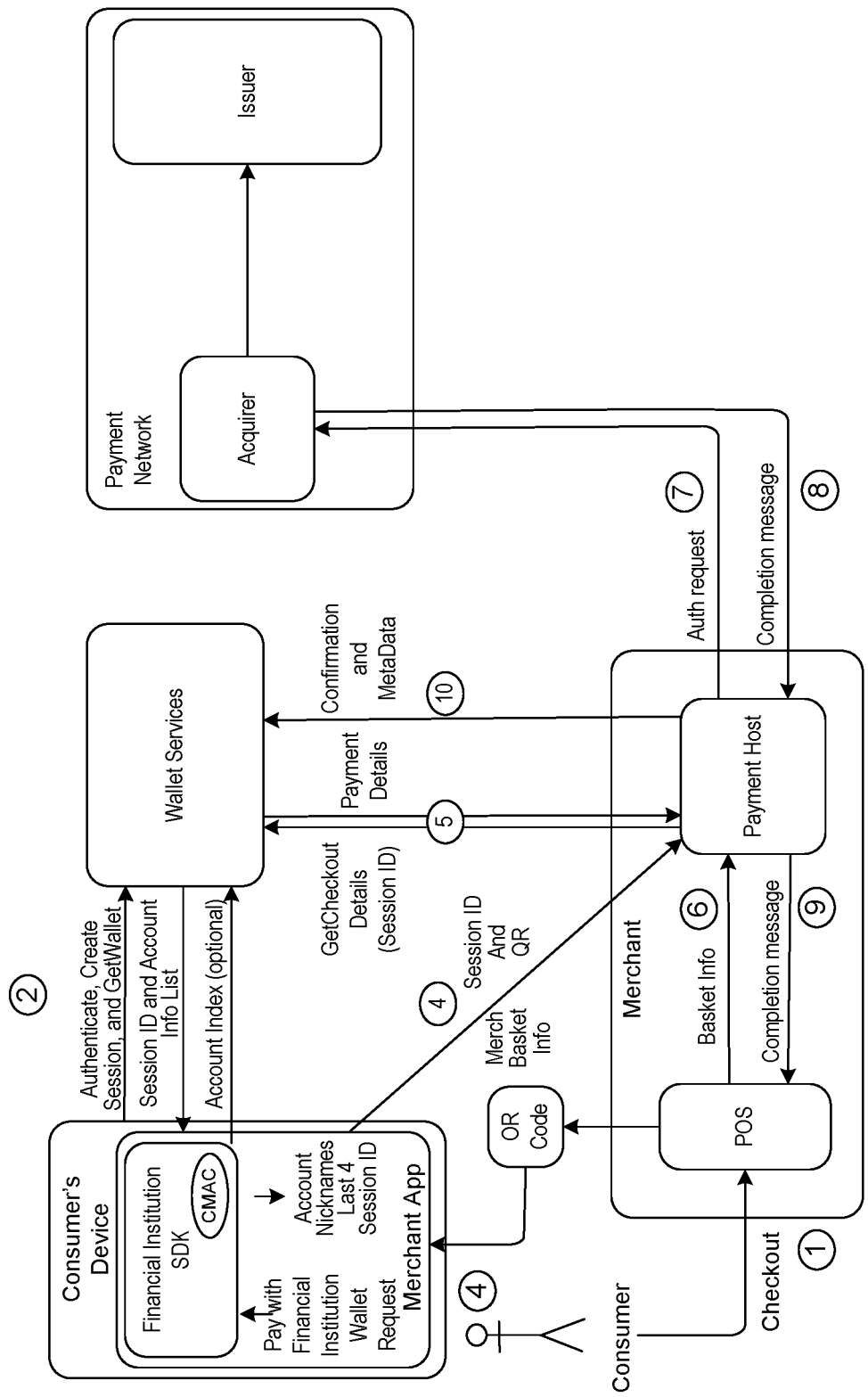
FIG. 7 depicts an exemplary process flow of the method of FIG. 6 according to one embodiment.

An exemplary, non-limiting process flow is provided as FIG. 7.

Figure 8:
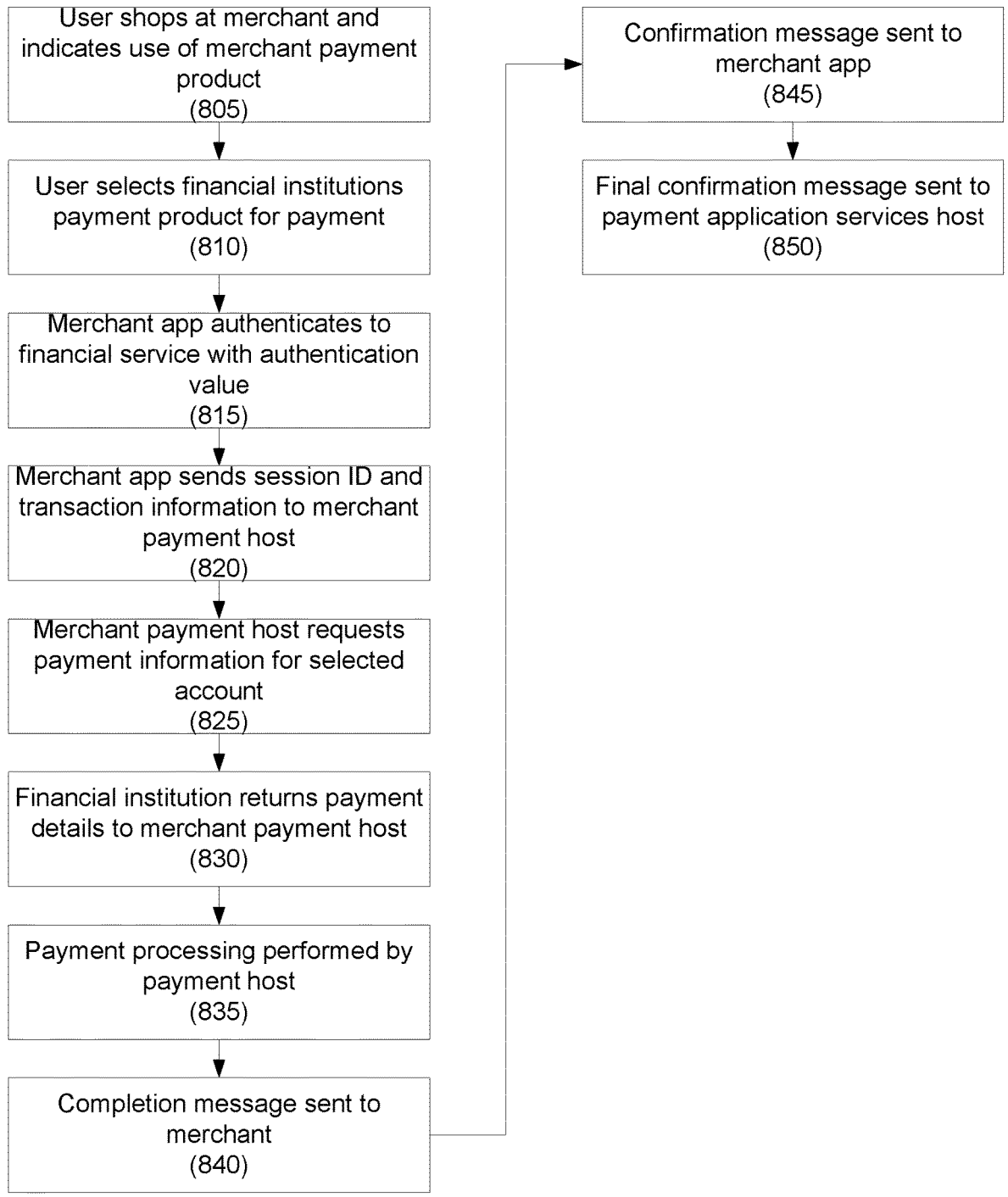
FIG. 8 depicts a checkout flow involving an authentication value according to another embodiment.

Referring to FIG. 8, a checkout flow involving an authentication value is provided according to another embodiment.

In step 805, a user may shop at the merchant, and, in step 810, may select to pay with the merchant's mobile payment product.

In step 815, the merchant app may leverage the financial service's payment product SDK (e.g., Chase Pay SDK) to connect and authenticate to the financial service's payment product services (e.g., ChasePay Services) using an authentication value, such as a CMAC, where a session ID may be created. The user may select an account from their wallet for the transaction.

In step 820, the merchant app may send the session ID and order information to the merchant's payment host.

In step 825, the merchant payment host may use an API (e.g., GetCheckoutDetailsPOS API) to request the payment info for the account selected by the user.

In step 830, the financial institution may return the payment details (e.g., digital primary account number, cryptogram, transaction ID, token expiration date, customer ID, etc.).

In step 835, payment processing may be performed as usual by the merchant's payment host via a connection to the issuer (e.g., Chase issuing) via a payment network (e.g., ChaseNet).

In step 840, a completion message may be sent from the issuer to the merchant, and, in step 845, a confirmation message may be sent to the merchant app. In one embodiment, the confirmation message may include, for example, the merchant name, address, date/time of transaction, amount, and a transaction reference number. In one embodiment, the confirmation message may include a barcode for the receipt, a uniform resource locator for the actual receipt image, etc.

In step 850, a final confirmation message may be sent to the wallet services host with metadata to support post transaction services. In one embodiment, the metadata may include, for example, the merchant name, address, date/time of transaction, amount, and a transaction reference number. In one embodiment, the confirmation message may include a barcode for the receipt, a uniform resource locator for the actual receipt, etc.

Figure 9:
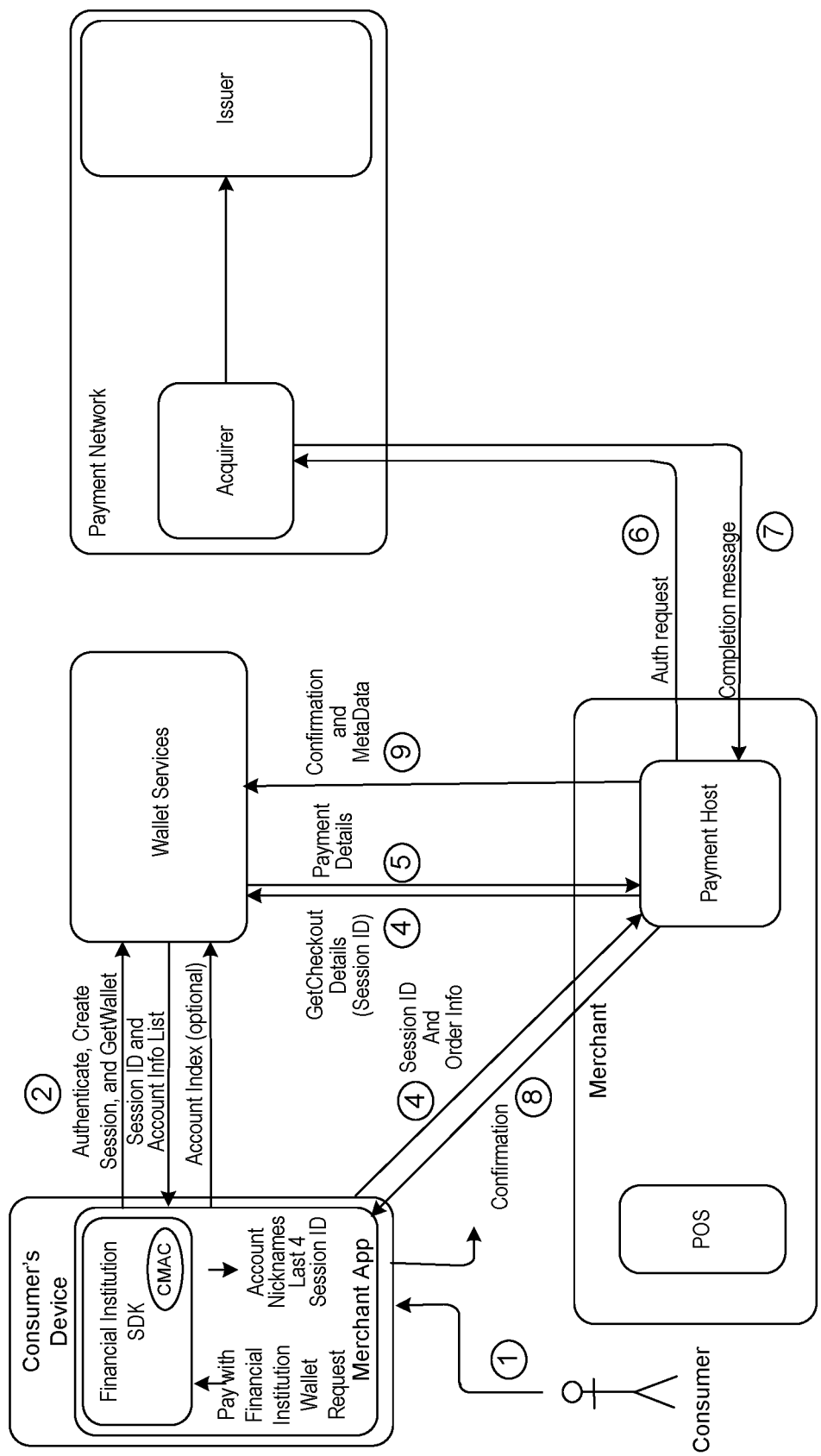
FIG. 9 depicts an exemplary process flow of the method of FIG. 8 according to one embodiment.

An exemplary, non-limiting process flow is provided as FIG. 9.

The disclosures of U.S. patent application Ser. No. 14/699,511, U.S. Provisional Patent Application Ser. No.

62/148,493, U.S. Provisional Patent Application Ser. No. 62/107,800, and U.S. Provisional Patent Application Ser. No. 62/037,891, filed Aug. 15, 2014 are hereby incorporated, by reference, in their entireties.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for conducting a transaction using an authentication value, comprising:

provisioning, by a backend for a financial institution, a transaction account for a financial institution customer to an electronic wallet executed by a customer electronic device;

downloading, by the customer electronic device, a merchant computer application;

receiving, by a point of transaction device of a merchant, a transaction request to pay for a transaction for a good or service using the transaction account, the transaction request comprising an authentication value that links the financial institution customer, customer electronic device information for the customer electronic device, and a merchant computer application identifier for the merchant computer application together;

authenticating, by the backend for the financial institution, the financial institution customer with the authentication value;

generating, by the point of transaction device for the merchant, a machine-readable code comprising an identifier for the good or service and displaying the machine-readable code on a display of the point of transaction device for the merchant;

receiving, by a merchant computer application executed by the customer electronic device, the identifier by reading the machine-readable code from the display;

receiving, by a payment host executed by an electronic device of the merchant, the identifier from the merchant computer application;

retrieving, by the payment host, transaction account information for the transaction associated with the identifier;

transmitting, by the payment host, an authorization request for the transaction comprising the transaction account information to the backend for the financial institution; and receiving, by the payment host, authorization from the backend for the financial institution.

2. The method of claim 1, further comprising:

the payment host receiving, from the merchant computer application, a session identifier and the identifier for the good or service; and the payment host communicating the session identifier to an electronic wallet service provider for the financial institution.

3. The method of claim 1, wherein the transaction account information comprises a cryptogram for a payment account.

4. The method of claim 1, wherein the customer electronic device is a mobile electronic device.

5. A system, comprising:

a merchant electronic device for a merchant executing a payment host;

a merchant point of transaction device for the merchant in communication with the merchant electronic device and comprising a display;

a backend for a financial institution executing a financial institution computer program; and a customer electronic device for a financial institution customer executing a merchant computer application comprising a merchant computer application identifier and an electronic wallet;

wherein:

the backend for the financial institution provisions a transaction account for a financial institution customer to the electronic wallet executed by the customer electronic device;

the customer electronic device downloads the merchant computer application;

the merchant point of transaction device receives a transaction request to pay for a transaction for a good or service using the transaction account, the transaction request comprising an authentication value that links the financial institution customer, customer electronic device information for the customer electronic device, and the merchant computer application identifier together;

the backend for the financial institution authenticates the financial institution customer with the authentication value;

the merchant point of transaction device generates a machine-readable code comprising an identifier for the good or service and displays the machine-readable code on the display;

the merchant computer application receives the identifier by reading the machine-readable code from the display;

the payment host receives the identifier from the merchant computer application;

the payment host retrieves a transaction account information for the transaction associated with the identifier;

the payment host transmits an authorization request for the transaction comprising the transaction account information to the backend for the financial institution; and the payment host receives authorization from backend for the financial institution.

6. The system of claim 5, wherein the payment host receives, from the merchant computer application, a session identifier and the identifier for the good or service; and the payment host communicates the session identifier to an electronic wallet service provider for the financial institution.

7. The system of claim 5, wherein the transaction account information comprises a cryptogram for a payment account.

8. The system of claim 5, wherein the customer electronic device is a mobile electronic device.

* * * * *